United States Patent
Arora et al.

(10) Patent No.: US 11,138,789 B1
(45) Date of Patent: Oct. 5, 2021

(54) ENHANCED POINT CLOUD FOR THREE-DIMENSIONAL MODELS

(71) Applicant: A9.com, Inc., Palo Alto, CA (US)

(72) Inventors: Himanshu Arora, San Jose, CA (US); Divyansh Agarwal, Mountain View, CA (US); Arnab Dhua, Cupertino, CA (US); Chun Kai Wang, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 16/452,067

(22) Filed: Jun. 25, 2019

(51) Int. Cl.
G06T 17/20 (2006.01)
G06T 17/00 (2006.01)
G06T 7/521 (2017.01)

(52) U.S. Cl.
CPC .............. *G06T 17/20* (2013.01); *G06T 7/521* (2017.01); *G06T 2200/04* (2013.01); *G06T 2200/08* (2013.01); *G06T 2207/10028* (2013.01)

(58) Field of Classification Search
CPC ................................ G06T 17/20; G06T 17/00
See application file for complete search history.

(56) References Cited

U.S. PATENT DOCUMENTS

| | | | | |
|---|---|---|---|---|
| 9,070,285 | B1 * | 6/2015 | Ramu | G05D 1/0044 |
| 2010/0085353 | A1 * | 4/2010 | Zhou | G06T 17/00 |
| | | | | 345/419 |
| 2011/0169914 | A1 * | 7/2011 | Lowe | G06T 15/20 |
| | | | | 348/43 |
| 2014/0270480 | A1 * | 9/2014 | Boardman | G06T 11/206 |
| | | | | 382/154 |
| 2016/0253836 | A1 * | 9/2016 | Unten | G06T 17/00 |
| | | | | 345/420 |
| 2017/0004649 | A1 * | 1/2017 | Collet Romea | G06T 17/00 |
| 2017/0085733 | A1 * | 3/2017 | Ilic | G06T 7/74 |
| 2017/0323443 | A1 * | 11/2017 | Dhruwdas | G06T 7/0012 |
| 2020/0003869 | A1 * | 1/2020 | Yang | G01S 17/89 |

OTHER PUBLICATIONS

Non-Final Office Action issued in U.S. Appl. No. 16/452,050 dated Jun. 22, 2020.
Final Office Action issued in U.S. Appl. No. 16/452,050 dated Oct. 20, 2020.
Notice of Allowance issued in U.S. Appl. No. 16/452,050 dated Dec. 30, 2020.

* cited by examiner

*Primary Examiner* — Yi Yang
(74) *Attorney, Agent, or Firm* — Hogan Lovells US LLP

(57) ABSTRACT

Approaches described and suggested herein relate to generating an enhanced point cloud representation of an objection and generating a surface mesh from the enhanced point cloud. The surface mesh can be used to render three-dimensional representations of objects on personal devices such as smartphones and personal computers, for example. Generating an enhanced point cloud of an object includes capturing a plurality of images of the object from a plurality of viewpoints about the object, generating an initial point cloud representation of the object from the plurality of images, generating a preliminary surface mesh from the point cloud using a Delauney-based meshing algorithm, and sampling points from the preliminary surface mesh. The sampled points are then added to the point cloud to form the enhanced point cloud. A final surface mesh can then be generated from the enhanced point cloud using a Poisson-based meshing algorithm.

15 Claims, 10 Drawing Sheets

ENHANCED POINT CLOUD FOR THREE-DIMENSIONAL MODELS

Users are increasingly purchasing items over the Internet. However, users are generally unable to view or touch items without making a purchase, which sometimes causes hesitance in the user. Additionally, when a customer receives delivery of an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. Providing an accurate rendering of the object may help with the ordering process and increase purchase satisfaction.

BRIEF DESCRIPTION OF THE DRAWINGS

Various embodiments in accordance with the present disclosure will be described with reference to the drawings, in which.

DETAILED DESCRIPTION

Figure 1A:
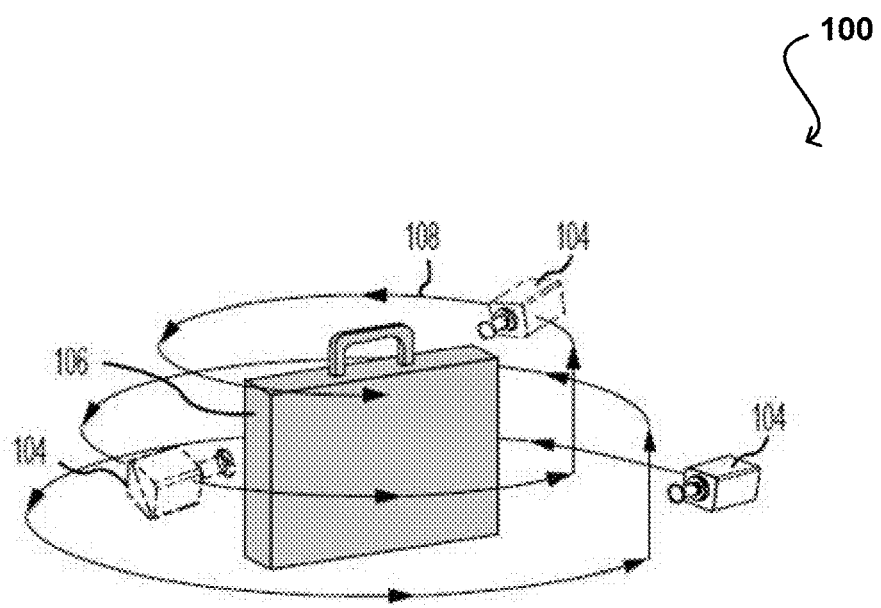
FIGS. 1A-1B illustrate an example virtual image capture system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to generating three-dimensional representations of objects to be used to render virtual reality and augmented reality effects on personal devices such as smartphones and personal computers, for example. Specifically, various embodiments provide for a relatively low-resource three-dimensional model generation technique that suitably handles different types of object surfaces, including low-feature surfaces (e.g., smooth, reflective, dark) and surfaces that have concave elements. In some embodiments, an object for which a three-dimensional model is to be made may be placed in an environment, and images of the object are captured from a plurality of different viewpoints around the object. The images may be captured using one or a plurality of cameras. The images may each portray a two-dimensional view of the object from the respective viewpoint. In some embodiments, the viewpoints from which the images are capture may be on a hemisphere or sphere about the object. In some embodiments, structured light patterns may be projected onto the environment including the object.

A dense point cloud is generated from the images taken at the plurality of viewpoints around the object. In some embodiments, a point cloud includes a series of points positioned to form a "cloud" representing the outer surfaces of the object. The constructed point cloud may have varying degrees of point density at different regions, such as depending on the photometric properties of the object's surfaces. Some surfaces, such as reflective or dark surfaces are photometrically less distinctive or unreliable. For example, dark surface may be difficult to distinguish while some reflective surface may appear to have artifacts picked up from the reflection when the surface is actually smooth or flat. Thus, the point cloud at these regions may be less dense and/or prone to reconstruction errors. The present techniques also include additional techniques that can be optionally used to improve the quality of the generated point cloud, as discussed in further detail below with respect to FIG. 3, albeit the challenges caused by reflective or dark surface may still remain.

In addition to generating a point cloud of the object, silhouette masks are generated from each image captured at the plurality of viewpoints and used to help distinguish space occupied by the object from the rest of the environment. In some embodiments, each pixel in a silhouette mask may have one of two values, corresponding to whether the pixel represents the object or space not taken up by the object. A silhouette mask corresponding to a particular viewpoint is generated from the image of the object at that viewpoint by determining whether each pixel of the image represents a portion of the object or not. If a pixel of the image is determine to represent a portion of the object, then the corresponding pixel of the silhouette mask is give a first value of the two possible values. For example, pixels associated with the object can be white in the silhouette mask and pixels not associated with the object can be black, or vice versa. Three-dimensional model construction using such silhouette masks is generally robust to reflective or dark surfaces and thus overcomes the abovementioned vulnerability of point cloud based construction. However, silhouette mask based construction has difficulty handling concave surfaces, as such features would not be seen in any of the silhouette masks taken at any viewpoint, and are thus unaccounted for. However, such concave features are usually detectable and accounted for in a point cloud representation. Thus, silhouette mask data and point cloud data overcome each other's weaknesses and both types of data are used in generating a final three-dimensional representation of the object shape, also called a surface mesh.

In generating a surface mesh representation of the object, a three-dimensional environment in which the object is located is first determined, such as using the images captures at the plurality of viewpoints. The three-dimensional environment is discretized into a plurality of three-dimensional spatial units called voxels. For each voxel, the silhouette mask data and the point cloud data are used to determine whether the voxel represents a portion of the object or not. In some embodiments, each voxel can be assigned one of two values (e.g., 1 or 0) corresponding to whether the voxel is inside the object or outside of the object. The voxels that are ultimately determined to represent a portion of the object is used to define the surface mesh of the object. In determining whether a particular voxel represents a portion of the object, each viewpoint gets a "vote" based on the data associated with each viewpoint. In this context, a vote is an estimation of whether the voxel is inside the object or outside of the object based on the data associated with that viewpoint.

For each viewpoint, a depth map and a corresponding confidence map are generated from the initial surface mesh. A depth map for a certain viewpoint provides information relating to the distance of the surfaces of the initial surface mesh from the corresponding viewpoint (i.e., an estimation of how far a portion of the object is from the camera/viewpoint). In some embodiments, a depth map has a two-dimensional resolution which may or may not be equivalent to the image resolution, and a depth value for each unit defined by the depth map resolution. In some embodiments, the depth value may be on a discrete scale with a certain resolution. The confidence map corresponding to a depth map indicates the confidence level of the depth estimations across the depth map. For example, in some embodiments, the confidence map may have a resolution corresponding to that of the depth map. Each unit of the confidence map corresponds to a unit of the depth map, and each unit of the confidence map has a confidence value corresponding to the estimated depth value of the corresponding unit of the depth map. The confidence value may be calculated during the creation of the initial surface mesh. Generally, regions with high point density in the point cloud or otherwise robust data will result in higher confidence value, and regions with low point density or artifact may result in lower confidence value. A confidence value threshold may be set, and used to determine whether a depth value is to be used in forming the final surface mesh.

For each viewpoint, if a voxel is outside of the object as determined based on the silhouette mask data, then the voxel is determined to not represent a portion of the object according to the data at that viewpoint. If the voxel is inside the object as determined based on the silhouette mask data, then the depth map and confidence map associated with that viewpoint can be used to confirm if the voxel is indeed inside the object or if the voxel is actually concave space that could not be seen in the silhouette mask data. In some embodiments, if the silhouette mask data indicates that the voxel is inside the object and the depth map indicates that the voxel is outside of the object, then the confidence map is used to determine which way to vote at that viewpoint. For example, a confidence threshold condition may be set, and if the confidence value associated with the depth estimation at the voxel satisfies the confidence threshold condition, then the vote follows the depth map data and the viewpoint votes that the voxel is outside of the object. If the confidence value does not satisfy the confidence threshold condition, then the vote follows the silhouette mask data and the viewpoint votes that the voxel is inside the object.

To make a final decision on whether a voxel is inside the object or not, the votes from all the viewpoints are aggregated. In some embodiments the votes may be weighted or calculated according to a certain aggregation algorithm to produce the final decision. This process is performed for all the voxels. Thus, every voxel is individually designated as either being inside (i.e., representing a portion of) the object or outside (i.e., not representing a portion of) the object. A surface mesh, or three-dimensional representation of the shape of an object, is generated based at least in part on the voxels that are determined as being inside the object. Additionally, the final surface mesh structure may be optimized for mobile device viewing. The surface mesh structure and viewpoint images can be packaged and provided to a mobile device. When the surface mesh structure is viewed from a certain angle, the appropriate image can overlay the object mesh structure, such that a user of the mobile device can view a photorealistic three-dimensional representation of the object. Various other such functions can be used as well within the scope of the various embodiments as would be apparent to one of ordinary skill in the art in light of the teachings and suggestions contained herein.

Figure 1B:
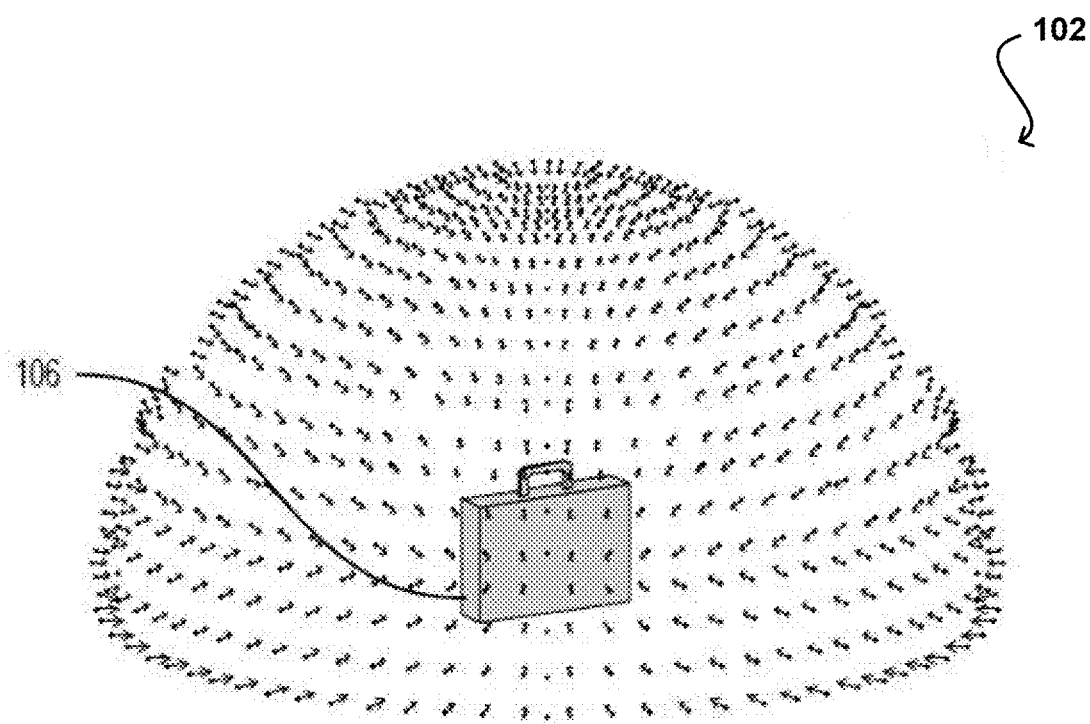

An image capture system 100 for obtaining images of object from a plurality of viewpoints is illustrated in FIG. 1A. In the example shown in FIG. 1A, a camera 104 captures a number of images of an object 106. In embodiments, the camera 104 moves around the object 106 in a predefined camera path 108. The camera path 108 can be configured to allow the camera 104 to view the object 106 from a plurality of viewpoints. In embodiments, the camera 104 can capture images at over a thousand locations along the camera path 108. For example, as illustrated in FIG. 1B, the camera can capture views corresponding to the illustrated hemisphere 102 about the object 106. A plurality of cameras can be used to capture images at the different viewpoints. For example, in some embodiments, nineteen cameras can be used and travel along distinct camera path, each of which captures an image at 72 different locations along their camera path. This would result in 1,368 images at distinct viewpoints. Likewise, one camera may be used, in which the single camera is movable between all of the viewpoints to capture all 1,368 images. In some embodiments, the object may be placed on a turntable that rotates, and thereby rotates the object, with respect to the cameras. For example, in some embodiments, the turntable may rotate 360 degrees in a horizontal orientation and a camera may move in a vertical orientation. Together, this allows the camera to capture views of the object from a plurality of viewpoint, such as an entire hemisphere of viewpoints about the object. The "density" of this viewpoint hemisphere 102, or total number of viewpoints at which images are captured, can be selectively configured for designed for. In some embodiments, to increase the robustness of the data, structured light patterns are projected onto the scene. Since the structured light is reflected by surfaces, depth information can be more robustly obtained from the captured images.

When an image is captured, pose information can be recorded as well. The pose information indicates the angle at which a particular image was captured. To record pose information, a coordinate system can be anchored on the object. That is, the origin of a three-dimensional coordinate system can be located on the object. For example, a coordinate system can be anchored to the bottom center of the representation of the object. That is, the bottom center of the representation of the object can be the origin of the coordinate system. In embodiments, the coordinate system can be anchored to the center of a cross section at the midpoint of the representation of the object's height, which would correspond to the center of the representation of the object. In embodiments, rather than using a global anchor system, specific points on the representation of the object can be used. The angle information recorded for a image indicates (i) where the camera was located in the coordinate system at the time of capture, and (ii) how the camera was oriented with respect to the object at the time of capture. The rays representing the various viewpoints in FIG. 1B provide an example illustration of poses, with each point representing a camera location and each arrow representing a camera orientation. Each component of the pose, the camera location, and the camera orientation, can be represented by three degrees of freedom within the coordinate system, such that each pose is defined by six degrees of freedom. Three degrees of freedom provide the camera location and another three degrees of freedom indicate the direction in which the camera was pointing during image capture. In some embodiments, camera intrinsics can also be recorded. This information can include the focal lengths and principal point for each camera.

Figure 2:
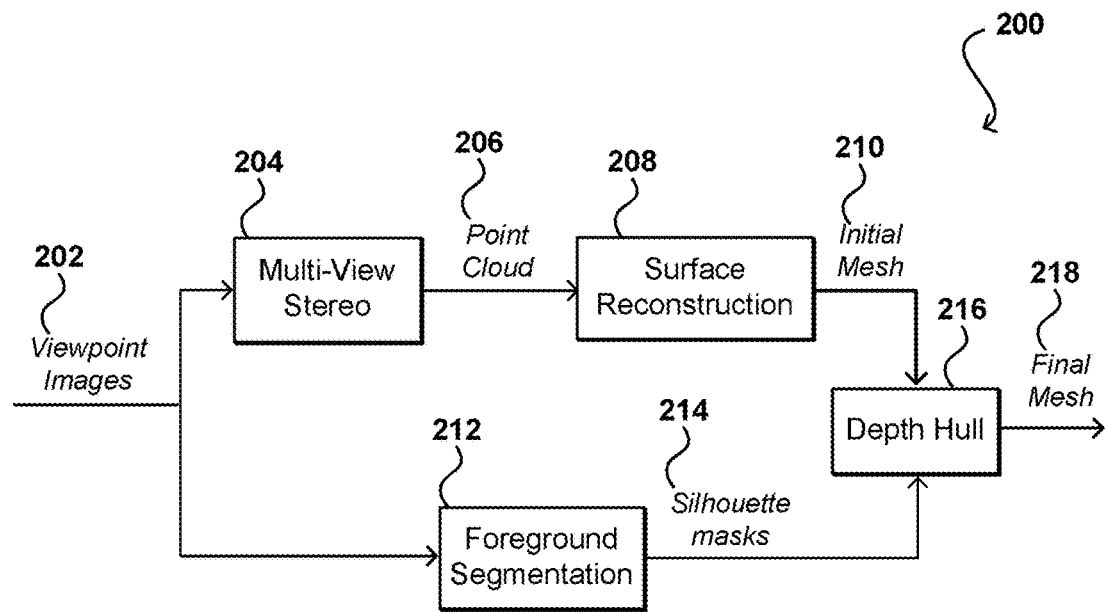
FIG. 2 illustrates a process pipeline for generating a three-dimensional surface mesh of an object in accordance with the present disclosure.

FIG. 2 illustrates a process pipeline 200 for generating a three-dimensional surface mesh of an object in accordance with the present disclosure. As described above, a plurality of images 202 of the object are captured from a plurality of viewpoints all around the object. The images 202 may each portray a two-dimensional view of the object from the respective viewpoint. In some embodiments, such images 202 may already exist and are simply accessed for the purposes of the present technique. The images 202 are then processed through two different techniques to obtain two types of data used to construct a final surface mesh 218 of the object. Specifically, the images 202 are processed through a multi-view stereo algorithm 204 to generate a dense point cloud 206 representation of the object. In some embodiments, the point cloud 206 undergoes surface reconstruction 208 to generate an initial surface mesh 210. The initial surface mesh represents three-dimensional shape of the object as determined using the point cloud information. Techniques for creating the initial surface mesh 210 are discussed in greater detail with respect to FIG. 3.

The plurality of images 202 captured at the plurality of viewpoints are also processed through a foreground segmentation technique 212 to produce a plurality of silhouette masks 214, or silhouette images, corresponding to the plurality of viewpoints. In some embodiments, a different set of images is used for the foreground segmentation 212 than used for the multi-stereo algorithm 204. Specifically, images captured using the abovementioned structured light pattern projections may be used for the multi-stereo algorithm 204, while normal RGB images captured without added structured light projections are used for the foreground segmentation. In some embodiments, each viewpoint image 202 is converted to a silhouette mask. The foreground segmentation technique 212 determines which pixels of an image are associated with the object and which pixels are not associated with the object. In some embodiments, each pixel in a silhouette mask may have one of two values, corresponding to whether the pixel represents the object or not. For example, pixels associated with the object can be white in the silhouette mask and pixels not associated with the object can be black, or vice versa.

Both of the techniques above have certain shortcomings with respect to generating a three-dimensional model. The multi-view stereo/point cloud technique may have trouble reconstructing reflective or dark surfaces. Such surfaces may be photometrically less distinctive or unreliable, and thus carry sparse information or misleading artifacts. Thus, the point cloud at these regions may be less dense and/or prone to reconstruction errors, which may cause degradation of the initial surface mesh. Three-dimensional model construction using such silhouette masks is generally robust to reflective or dark surfaces and thus overcomes the abovementioned vulnerability of point cloud based construction. However, silhouette mask based construction has difficulty handling concave surfaces, as such features would not be seen in any of the silhouette masks taken at any viewpoint, and are thus unaccounted for. Such concave features are usually detectable and represented in a point cloud representation. Thus, both silhouette mask data and point cloud/initial surface mesh data overcome each other's weak points and both are used in a depth hull reconstruction technique 216 to generate a final surface mesh 218 representation of the object. The depth hull reconstruction technique 216 is described in further detail below with respect to FIGS. 5A-5C.

Figure 3:
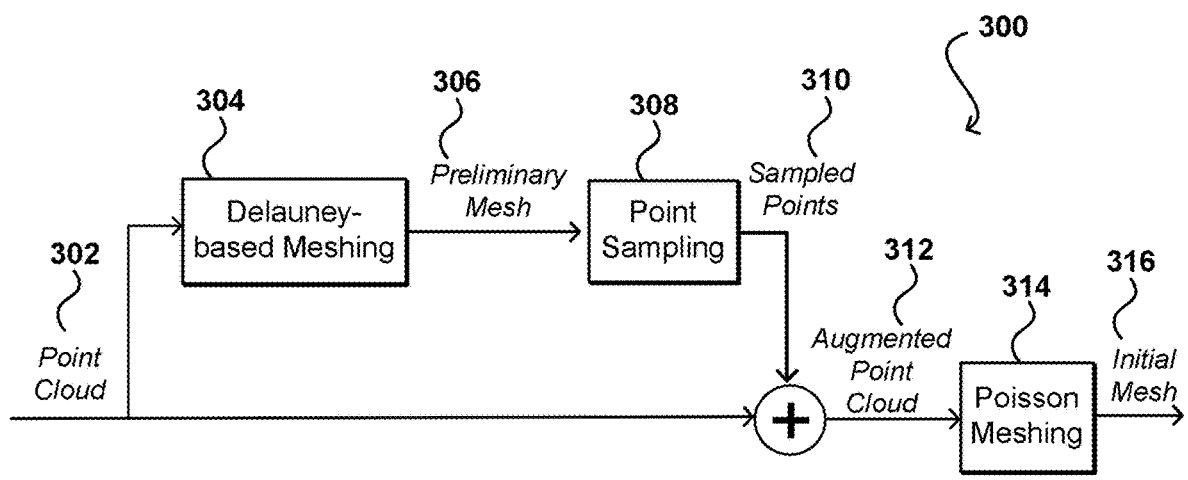
FIG. 3 illustrates a pipeline for generating an initial surface mesh using a multi-view stereo and point cloud approach, in accordance with example embodiments.

FIG. 3 illustrates a pipeline 300 for generating an initial surface mesh using a multi-view stereo and point cloud approach, in accordance with example embodiments. As mentioned, the images captured at the plurality of viewpoints are used to compute a dense point cloud 302. In some embodiments, such as due to physical constraints of the camera setup, point cloud generation is divided into many independent multi-view stereo problems based on the turntable's rotation position. For example, first, the point cloud for each "longitude" is separately obtained, and the final output point cloud is simply the aggregation of the point clouds for all the longitudes. In some embodiments, during the scanning process, as the object rotates with the turntable, an active illumination and/or structured light stay fixed. Therefore, the projected pattern shifts its relative position with respect to the object across different turntable positions, and feature points are matched within images taken at the same longitude.

The constructed point cloud 302 can have varying degree of point density, such as depending on the photometric property of the scanned object's surface. Around glossy or dark surfaces, multi-view stereo data becomes less reliable because reflection of the projected pattern is less distinctive, resulting in lower point density in those regions. Thus, the resulting point cloud may have regions with missing data, which presents a challenge for surface reconstruction. For example, surface reconstruction using screened Poisson techniques can produce artifacts (e.g., erroneous and/or protruding surfaces) when it needs to extrapolate a large region with missing points. Otherwise, when given sufficient data points, this algorithm generates smooth surfaces and can handle noisy data well. One goal of the present technique is to minimize the artifacts that may be produced. In order to do that, a Delaunay meshing technique is used. Delaunay triangulation based methods produce piecewise linear approximation for areas of the point cloud that has missing data or low point density. It performs a tightest possible short circuiting at those areas, which prevents bloated or protruding surfaces. While it behaves better with non-uniform sampling of the point cloud, the Delauney generated mesh tends to be chunky and less detailed than the Poisson generated mesh. To mitigate the shortcomings of either method, a technique is used which utilizes data from both method to produce a more reliable initial surface mesh.

Specifically, the Delauney-based meshing 304 is first performed on the raw point cloud data 302 to produce a preliminary surface mesh 306. Point sampling is then performed on the Delauney generated preliminary mesh 306, and the sampled points 310 are used to fill in the original raw point cloud 302 where there is missing data or low point density, producing an augmented point cloud 312. The augmented point cloud has more complete data than the original point cloud 302. In some embodiments, the Poisson-based meshing technique 314 is applied to the augmented point cloud 312 to generate the initial surface mesh 316 used in FIG. 2. Alternatively expressed, given the input point set ($P_{in}$) of the point cloud, a preliminary Delauney mesh ($M_d$) is generated using a Delaunay triangulation approach. Sample points are then uniformly taken from the surface of Delauney mesh ($M_d$). Let the sample points be denoted as $P_d$. The input point set ($P_{in}$) of the point cloud and the sampled points ($P_d$) are aggregated to generate an aggregated points cloud ($P_{agg}$), where $P_{agg}=P_d \cup P_{in}$. The aggregated points cloud ($P_{agg}$) is then used in screened Poisson surface reconstruction to generate the initial surface mesh ($M_p$) to be used in the three-dimensional depth hull reconstruction outlined in the pipeline of FIG. 2. In some embodiments, a confidence score $C_1$ is computed for each vertex $V_i$ in the augmented point cloud or initial mesh. Regions with higher point density imply better multi-view stereo reconstruction, and thus the corresponding vertices in the region will have higher confidence scores. Confidence scores provides thresholding capability and thus increased flexibility and in determining whether to use the multi-view stereo data or the silhouette data is determining the final object surface mesh.

Figure 4A:
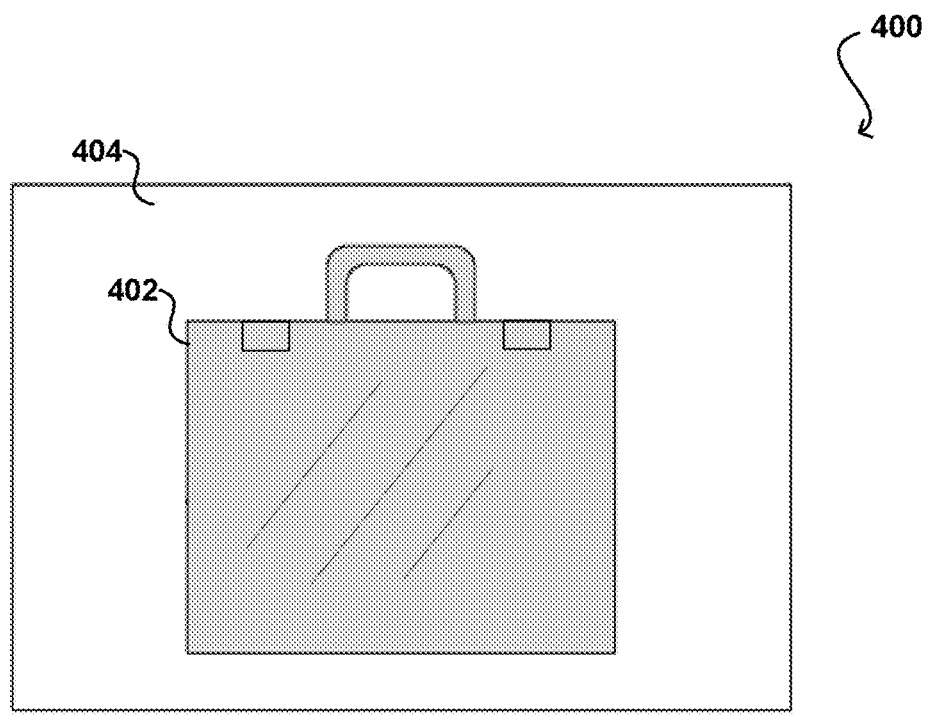
FIG. 4A-4B illustrate an example object and silhouette image in accordance with various embodiments.
Figure 4B:
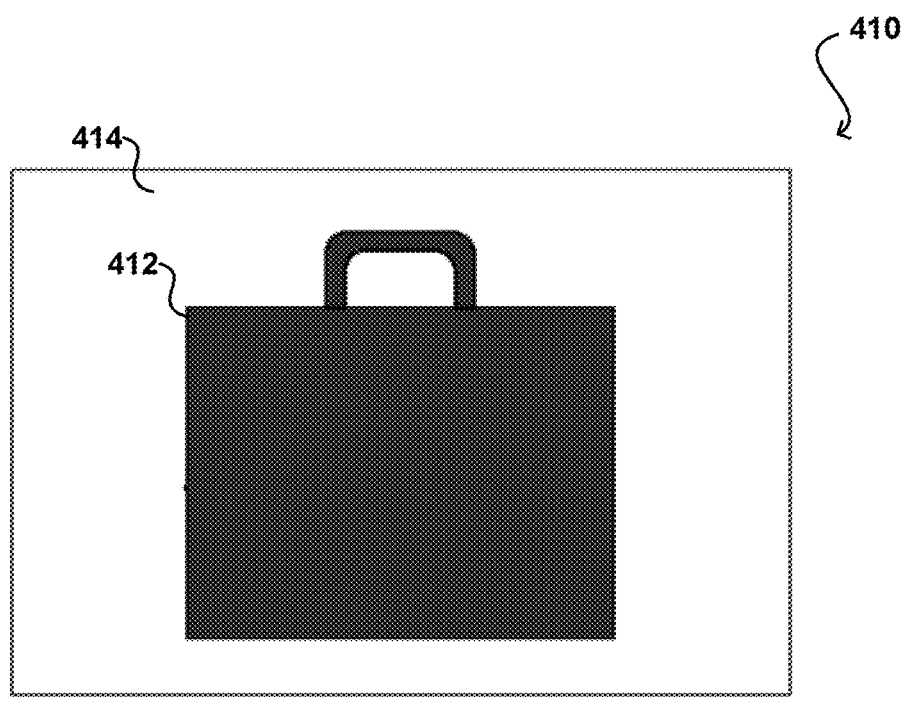

Silhouette masks are also generated from each image captured at the plurality of viewpoints. FIG. 4A illustrates an example of an image 400 of an object 402 and a background or scene 406 taken from a certain viewpoint, in accordance with example embodiments. FIG. 4B illustrates an example of a silhouette mask 410 generated from the image 400, in accordance with example embodiments. The image 400 is a two-dimensional (i.e., flat) representation of a scene including the object 402 from a specific viewpoint. The image 400 may be made up of a plurality of two-dimensional pixels. The foreground segmentation technique 212 (FIG. 2) determines which pixels of an image 400 are illustrate a portion of the object 202 and which pixels do not illustrate a portion of the object (i.e., illustrates the background 404). In some embodiments, the pixels of the silhouette mask 410 correspond to the pixels in the image 400, in which each pixel in the silhouette mask 410 is assigned one of two values, depending on whether the corresponding pixel of the image 400 illustrates a portion of the object or not. For example, pixels that illustrate a portion of the object 412 can be black in the silhouette mask 410 and pixels not associated with the object 414 can be white, as illustrated in FIG. 4B, or vice versa. In various implementations, more than two pixel values can be used to show the degree of confidence with which it can be said that a pixel belongs to an object. In some embodiments, the resolution of the image may be degraded when generating the silhouette mask 410, in which a pixel in the silhouette mask 410 may correspond to a group or cluster of pixels. Such a silhouette mask 410 may be generated for each of the plurality of viewpoints.

The multi-view stereo/point cloud technique may have trouble reconstructing reflective or dark surfaces. Such surfaces may be photometrically less distinctive or unreliable, and carry sparse information or misleading artifacts. Thus, the point cloud at these regions may be less dense and/or prone to reconstruction errors, which may cause degradation of the initial surface mesh. Three-dimensional model construction using such silhouette masks is generally robust to reflective or dark surfaces and thus overcomes the above-mentioned vulnerability of point cloud based construction. However, silhouette mask based construction has difficulty handling concave surfaces, as such features would not be seen in any of the silhouette masks taken at any viewpoint, and are thus unaccounted for. Such concave features are usually detectable and represented in a point cloud representation. Thus, both silhouette mask data and point cloud/initial surface mesh data overcome each other's weak points and both are used in a depth hull reconstruction technique to generate a final surface mesh representation of the object.

In generating a three-dimensional surface mesh representation of the object, a three-dimensional environment in which the object is located is first determined, such as using the images captures at the plurality of viewpoints. The three-dimensional environment is discretized into a plurality of three-dimensional spatial units called voxels. For each voxel, the silhouette mask data and the point cloud data are used to determine whether the voxel represents a portion of the object or not. In some embodiments, each voxel can be assigned one of two values (e.g., 1 or 0). The voxels that are ultimately determined to represent a portion of the object is used to define the three-dimensional mesh of the object. In determining whether a particular voxel represents a portion of the object, each viewpoint gets a "vote" based on the data associated with each viewpoint. In this context, a vote is an estimation of whether the voxel is inside the object or outside of the object based on the data associated with that viewpoint. For each viewpoint, a depth map and a corresponding confidence map are generated from the point cloud data. The depth map provides an estimation of how far a portion of the object is from the camera and the confidence map indicates the confidence level of the depth estimation.

For each viewpoint, if a voxel is outside of the object as determined based on the silhouette mask data, the voxel is determined to not represent a portion of the object. If the voxel is inside the object as determined based on the silhouette mask data, then the depth map and confidence map associated with that viewpoint can be used to confirm if the voxel is indeed inside the object or if the voxel is actually concave space that could not be seen in the silhouette mask data. In some embodiments, if the silhouette mask data indicates that the voxel is inside the object and the depth map indicates that the voxel is outside of the object, then the confidence map is used to determine which way to vote at that viewpoint. For example, an inclusion confidence threshold condition may be set, and if the confidence value associated with the depth estimation at the voxel satisfies the inclusion confidence threshold condition, then the vote follows the depth map data and the viewpoint votes that the voxel is outside of the object. If the confidence value does not satisfy the inclusion confidence threshold condition, then the vote follows the silhouette mask data and the viewpoint votes that the voxel is inside the object.

To make a final decision on whether a voxel is inside the object or not, the votes from all the viewpoints are aggregated. In some embodiments the votes may be weighted or calculated according to a certain aggregation algorithm to produce the final decision. This process is performed for all the voxels. Thus, every voxel is individually designated as either being inside (i.e., a part of) the object or outside (i.e., not a part of) the object. A three-dimensional model representing the three-dimensional shape of the object, also called a surface mesh, is generated based at least in part on the voxels that are determined as being a part of the object. Accordingly, the surface mesh structure may be optimized for mobile device viewing. The surface mesh structure and viewpoint images can be packaged and provided to a mobile device. When the surface mesh structure is viewed from a certain angle, the appropriate image can overlay the object mesh structure, such that a user of the mobile device can view a photorealistic three-dimensional representation of the object.

Figures 5A, 5B, 5C:
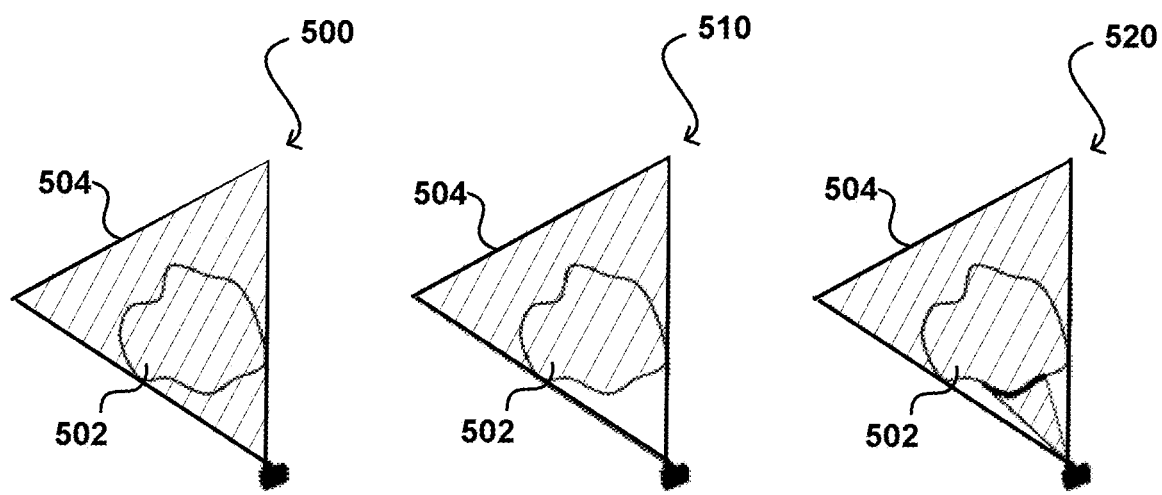
FIGS. 5A-5C illustrate estimations of an object with respect to the present techniques, in accordance with example embodiments.

FIGS. 5A-5C illustrate estimations of an object with respect to the present techniques, in accordance with example embodiments. The shaded regions indicate what is estimated to be part of the object under the different techniques from the given viewpoint, and white space indicates what is estimated to be outside of the object. Specifically, FIG. 5A illustrates an estimation 500 of the object using the silhouette mask data. Given an image of the object 502 from viewpoint, its silhouette mask constraints the object extent to a visual cone 504. This can be used as an upper or outer bound for where the object 502 is. In other words, the object cannot be closer to the camera than indicated through the silhouette mask data. Also, absent any other structure information (e.g., multi-view stereo data), this upper bound can be used as viable estimate of structure. The voxels projecting outside the silhouette masks get a zero vote since they cannot be inside the object.

As mentioned, the present technique utilizes a volumetric approach, discretizing volume into voxels and designate whether each voxel is inside the object or not. Specifically, every image viewpoint votes on whether a voxel is inside the object or not. In some embodiments, the reconstructed initial surface mesh is projected onto a given viewpoint to generate a corresponding depth map and a corresponding confidence map. The depth map restricts the object extent in addition to that specified by the silhouette mask, since a voxel closer to the camera than its depth map cannot lie inside the object. FIG. 5B illustrates the estimation 510 of the object 502 based on the depth map associated with the given viewpoint, including the estimated depth information. As illustrated, the depth estimated through the multi-view stereo data is further from the camera than that estimated through the silhouette data shown in FIG. 5A. However, in some embodiments, whether the multi-view stereo depth determination is accepted over the silhouette mask depth determination depends on the confidence value associated with the multi-view stereo depth determination at that region. FIG. 5C illustrates an estimation 520 of the object using both the depth map data and the silhouette data. In the illustrated example, with reference to FIG. 5C, the confidence level associated with the circled regions falls below a threshold. The voxels projecting into regions with low confidence estimates revert back to silhouette mask depth determination. For regions with high confidence estimates, only voxels beyond the multi-view stereo depth measurement are given a positive (i.e., inside the object) vote. The per viewpoint voxel votes are aggregated over all available viewpoints and converted to a surface mesh by computing an iso-surface of this scalar field. The choice of iso-value may depend upon the error tolerance on votes. For example, errors can occur due to two separate sources with very different tolerances, including pixel errors in silhouette masks and metric errors in structure estimation.

Figure 6:
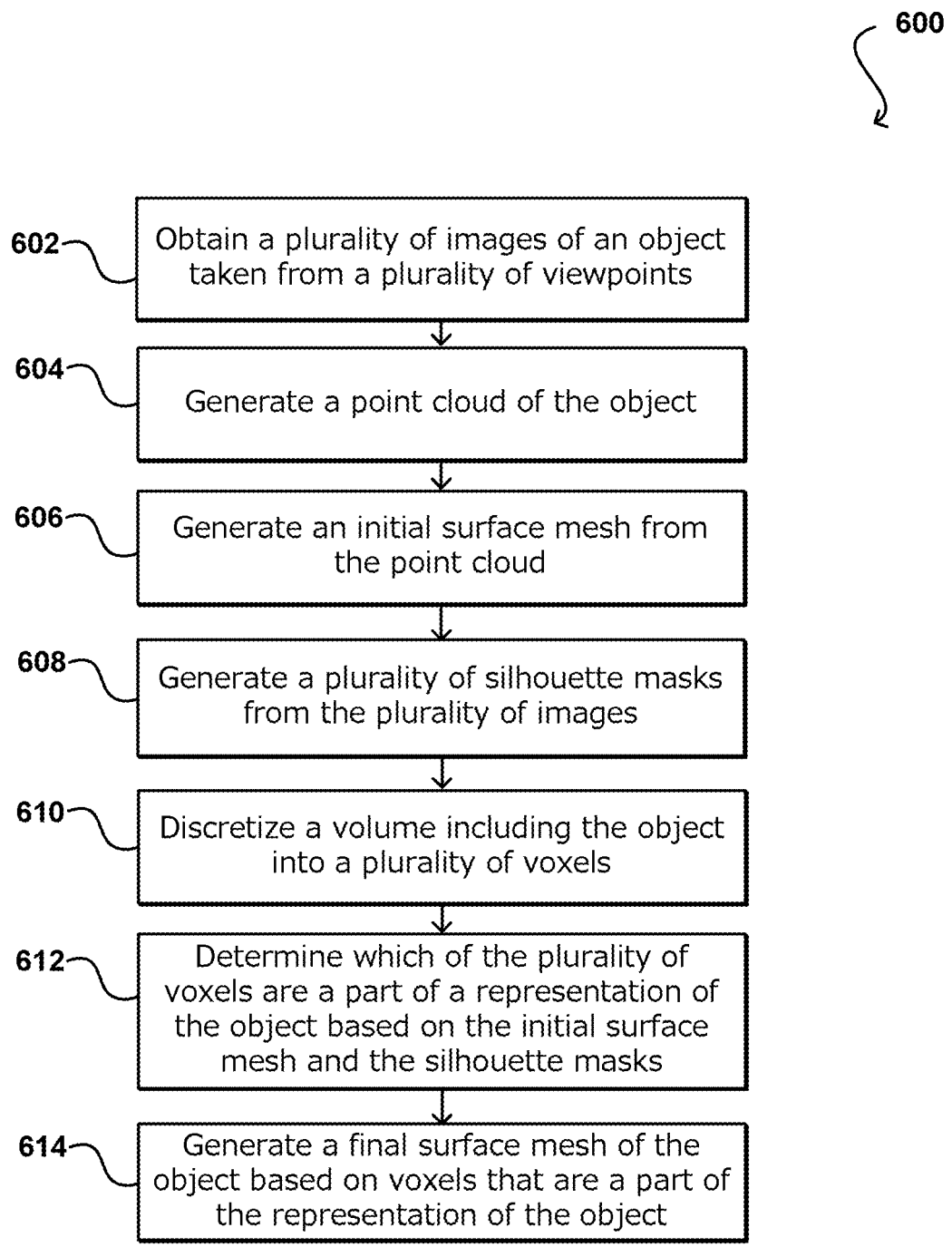
FIG. 6 illustrates an example method for generating a three-dimensional surface mesh of an object, according to embodiments of the present disclosure.

FIG. 6 illustrates an example method 600 for generating a three-dimensional surface mesh of an object, according to embodiments of the present disclosure. It should be understood that, for any process discussed herein, there can be additional, fewer, or alternative steps performed in similar or alternative orders, or in parallel, within the scope of the various embodiments. In this example, a plurality of images of an object taken from a plurality of viewpoints are obtained 602. Specifically, the plurality of images correspond to the plurality of viewpoints in a one-to-one manner. That is, each viewpoint has a corresponding image. The images may be captured using one or a plurality of cameras. The images may each portray a two-dimensional view of the object from the respective viewpoint. In some embodiments, the viewpoints from which the images are capture may be on a hemisphere or sphere about the object. In some embodiments, structured light patterns may be projected onto the environment including the object. A point cloud representing the object is generated 604 from the plurality of images. An initial surface mesh is then generated 606 from the point cloud. In some embodiments, generating an initial surface mesh is not required and the point cloud is used directly. A plurality of silhouette images is also generated 608 from the plurality of images. In some embodiments, each pixel in a silhouette mask may have one of two values, corresponding to whether the pixel represents the object or space not taken up by the object. A silhouette mask corresponding to a particular viewpoint is generated from the image of the object at that viewpoint by determining whether each pixel of the image represents a portion of the object or not. A volume including the object is discretized 610 into a plurality of voxels. Voxels are three-dimensional spatial units that make up a larger volume. The voxels are then each determined 612 to be either inside (i.e., a part of) a representation of the object or outside (i.e., not a part of) the representation of the object. Voxels that are not inside the representation of the object may include empty space around the object or background objects. A final surface mesh of the object is then determined based on the voxels that are determined to be inside or a part of the representation of the object.

Figure 7:
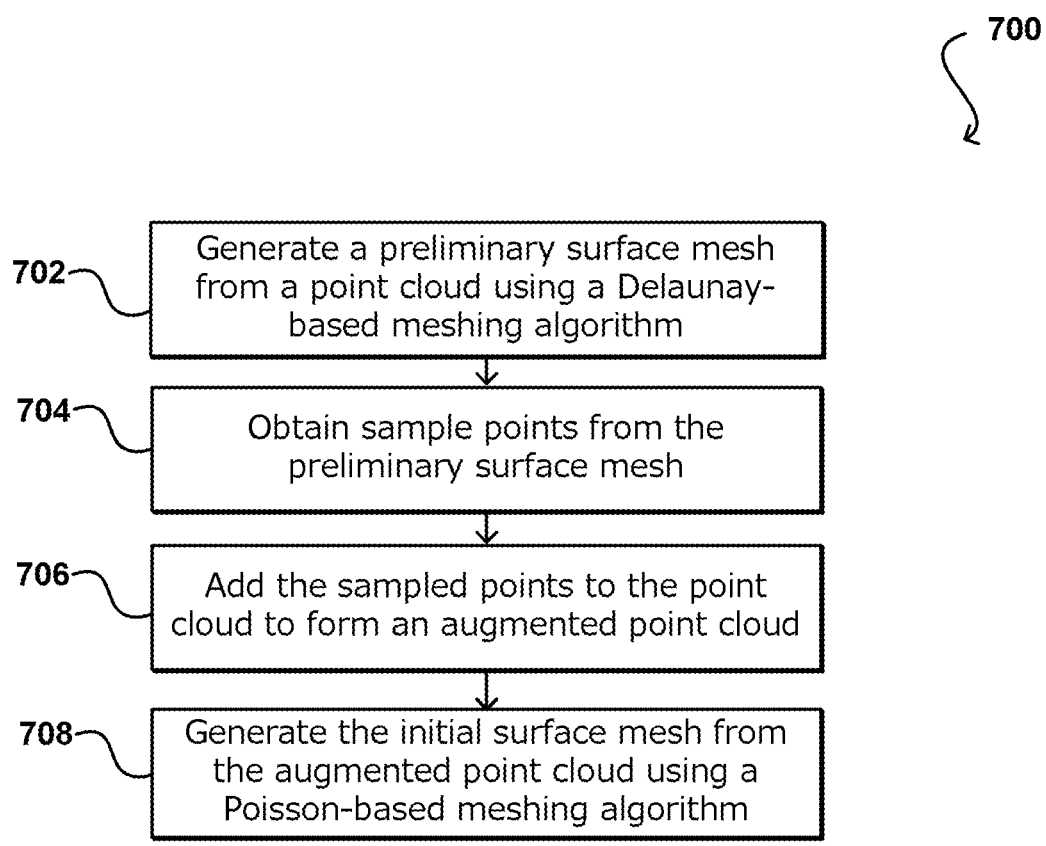
FIG. 7 illustrates an example method for generating an initial surface mesh, in accordance with example embodiments of the present disclosure.

FIG. 7 illustrates an example method 700 for generating an initial surface mesh, such as the initial surface mesh mentioned in step 606 of FIG. 6, in accordance with example embodiments of the present disclosure. In this example, a preliminary surface mesh is first generated 702 from a point cloud using a first meshing algorithm such as a Delaunay-based meshing algorithm. Sample points are then obtained 704 from the preliminary surface mesh. The sample points are then added 706 back into the original point cloud to form an augmented (i.e., enhanced) point cloud. In some embodiments, the points are sampled at uniform intervals about the preliminary surface mesh. In some embodiments, one or more sparse regions of the initial point cloud are determined, either manually or automatically, and the points are sampled from a portion of the preliminary surface mesh corresponding to the one or more space regions of the initial point cloud.

The added points may fill in regions of the point cloud that has sparse or missing points. In some embodiments, the initial surface mesh is generated 708 from the augmented point cloud using a second meshing algorithm such as a Poisson-based meshing algorithm. In some embodiments, various types of three-dimensional representations of the object may be generated from the augmented point cloud, and is not limited specifically to a surface mesh. In some embodiments, the augmented point cloud is used directly, along with the silhouette masks, to determine which of the plurality of voxels are a part of the object. Surface reconstruction using Poisson techniques alone can produce artifacts (e.g., erroneous and/or protruding surfaces) when it needs to extrapolate a large region with missing points. Delaunay triangulation based methods produce piecewise linear approximation for areas of the point cloud that has missing data or low point density. It performs a tightest possible short circuiting at those areas, which prevents bloated or protruding surfaces. While it behaves better with non-uniform sampling of the point cloud, the Delauney generated mesh tends to be chunky and less detailed than the Poisson generated mesh. The present techniques mitigate the shortcomings of either method.

In some embodiments, a method of generating

Figure 8:
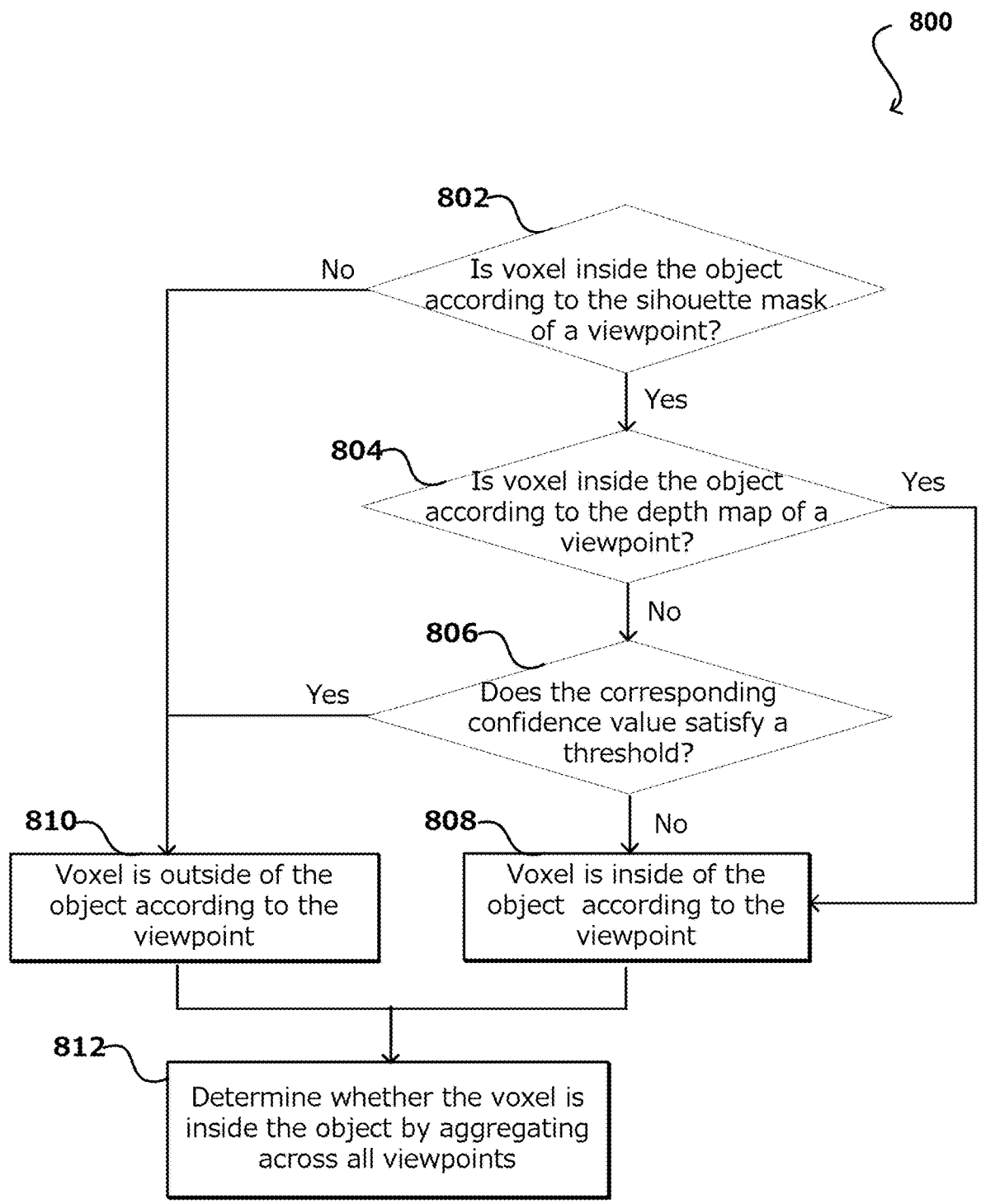
FIG. 8 illustrates an example method for determining whether a voxel is inside the object, according to embodiments of the present disclosure.

FIG. 8 illustrates an example method 800 for determining whether a voxel is inside the object, according to embodiments of the present disclosure. The method 800 may be used in step 612 of FIG. 6 to determine which of the plurality of voxels are a part of the object. In this example, for a particular voxel, if is determined 802 whether the voxel is inside the object according to the silhouette mask of a particular viewpoint. If the voxel is not inside the object according to the silhouette mask of the particular viewpoint, then the voxel is determined 810 to be outside of the object according to the particular viewpoint. If the voxel is determined to be inside the object according to the silhouette mask of the particular viewpoint, then the corresponding depth map is referenced. Specifically, it is then determined 804 whether the voxel is inside the object according to the depth map corresponding to the particular viewpoint. If the voxel is also determined to be inside object according to the corresponding depth map, then it can be determined 808 that the voxel is inside the object according to the viewpoint. However, if the voxel is not determined to be inside the object according to the depth map (i.e., if the silhouette mask and the depth map disagree), then the confidence map is referenced. Specifically, it is then determined 806 whether the depth determination has a confidence value that satisfies a threshold condition. If the confidence value does satisfy the threshold condition, then the voxel is determined to be outside of the object, as indicated by the depth map. If the confidence value does not satisfy the threshold condition, then the determination defaults to the silhouette mask-based determination that the voxel is inside the object 808. Alternatively expressed, in cases where the silhouette data and the depth map data disagree, if the confidence value associated with the depth determination satisfies the threshold condition, then the depth map-based determination is used. If the confidence value does not satisfy the threshold condition, then the silhouette mask-based determination is used. For example, in some embodiments, the confidence value may satisfy a threshold condition if the confidence value is above a certain value. In some embodiments, the confidence value may satisfy a threshold condition if the confidence value is below a certain value. In some embodiments, the confidence value may satisfy a threshold condition if the confidence value is within a certain range. Additionally, in some embodiments, the confidence value may be expressed as discrete levels (e.g., low, medium, high) rather than numerical numbers, and the threshold condition includes one or more acceptable levels.

The above-described steps may be performed for each viewpoint, using the corresponding silhouette mask and depth map. After a determination has been obtained for each viewpoint, the determinations are aggregated across all the viewpoints. In some embodiments the votes may be weighted or calculated according to a certain aggregation algorithm to produce the final decision. This process may be performed for all the voxels. Thus, every voxel is individually designated as either being inside (i.e., a part of) the object or outside (i.e., not a part of) the object.

Figure 9:
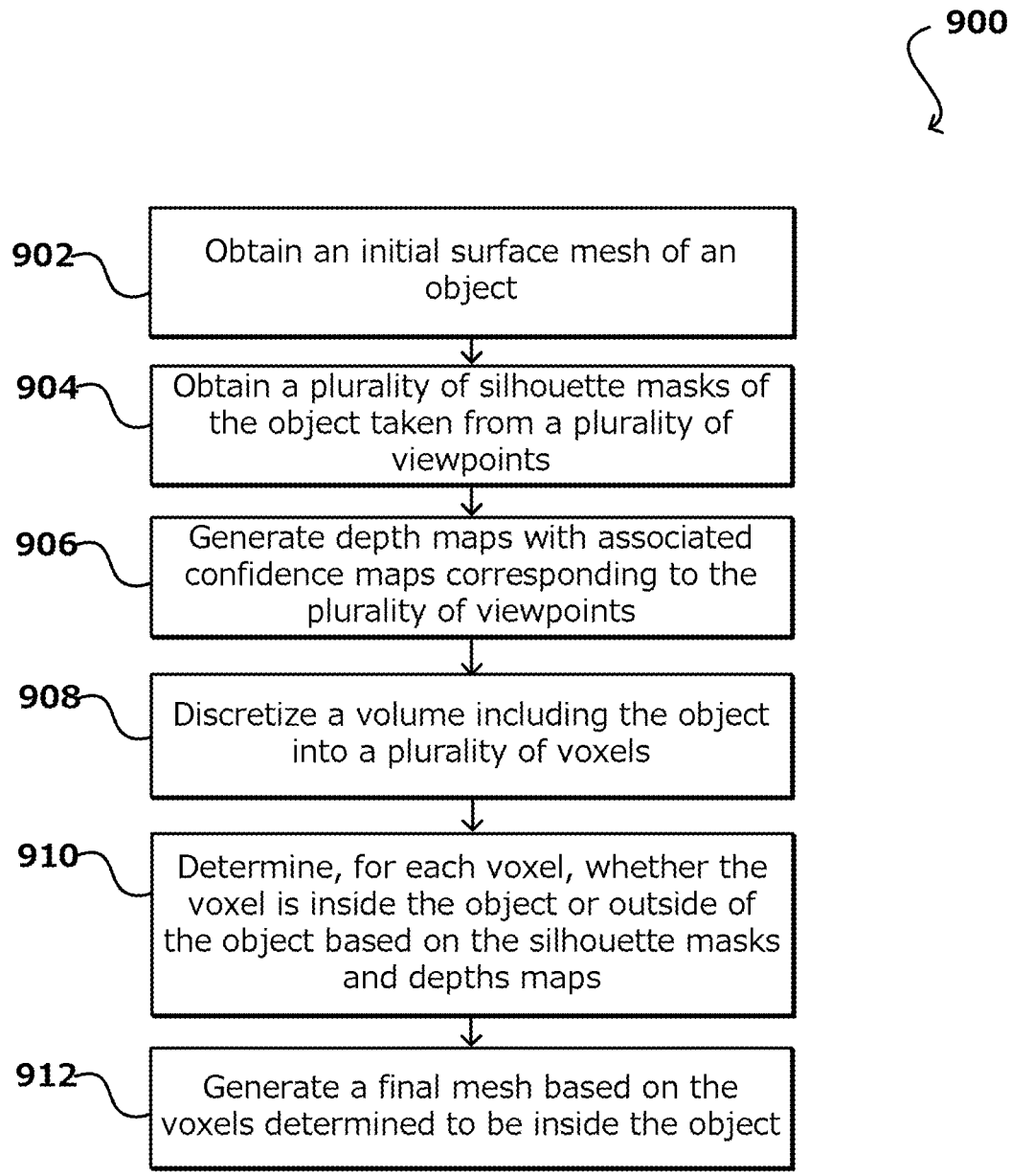
FIG. 9 illustrates an example method for generating a three-dimensional surface mesh of an object, according to embodiments of the present disclosure.

FIG. 9 illustrates an example method 900 for generating a representation (e.g., three-dimensional surface mesh) of an object, according to embodiments of the present disclosure. In this example, an initial surface mesh or point cloud of an object is obtained 902. The initial surface mesh may have been created using a multi-view stereo approach, or other mesh creating approach. The initial surface mesh or point cloud may have been previously generated or provided and stored in memory. A plurality of silhouette masks of the object taken from a plurality of viewpoints is also obtained 904. Similarly, the silhouette masks may have been previously generated or provided and stored in memory. A plurality of depth maps are generated 906 from the initial surface mesh or point cloud. Specifically, the plurality of depth maps are taken from the same plurality of viewpoints from which the silhouette images are taken. Each depth map has a corresponding confidence map. A volume including the object is discretized 908 into a plurality of voxels (e.g., three-dimensional spatial units). Each voxel is then determined 910 to be either inside the object or outside of the object based on the silhouette masks and the depth data. A final mesh is then generated 912 from the voxels that are determined to be inside the object.

Figure 10:
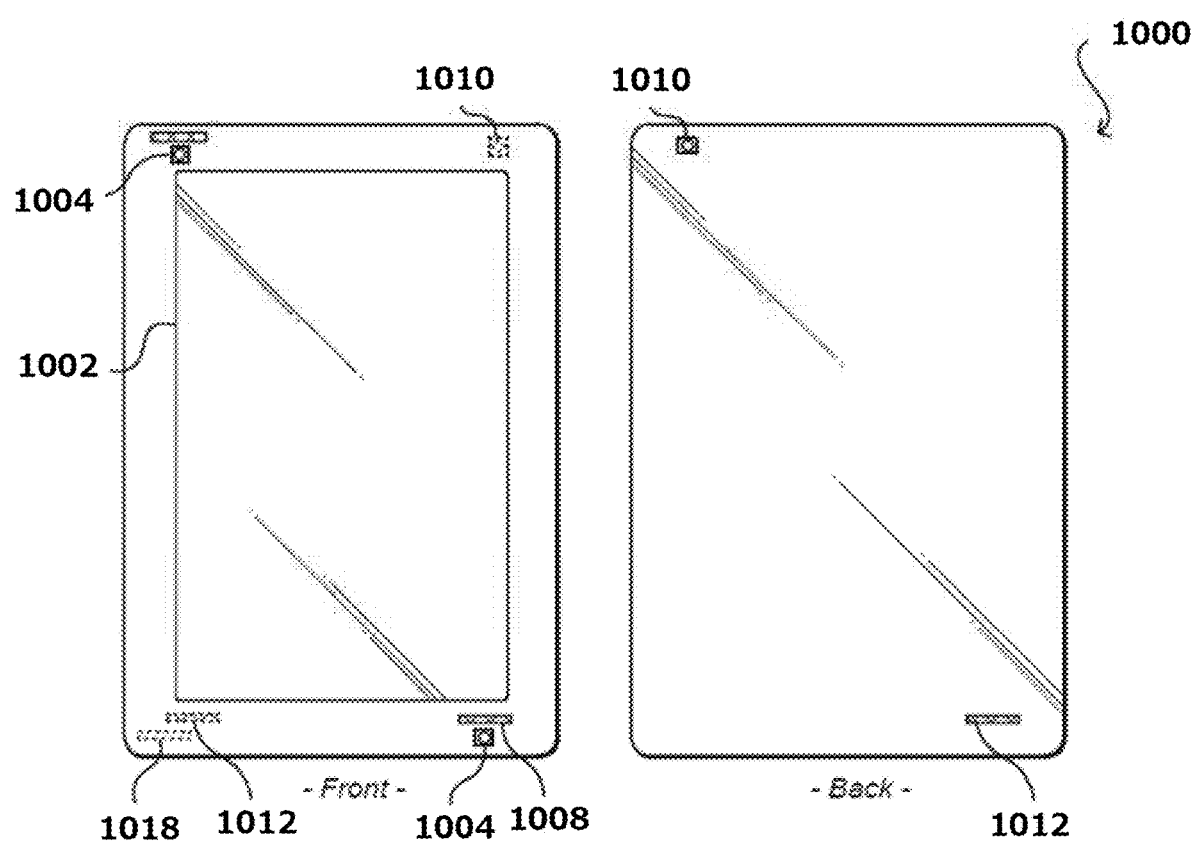
FIG. 10 illustrates an example computing device in accordance with various embodiments.
Figure 11:
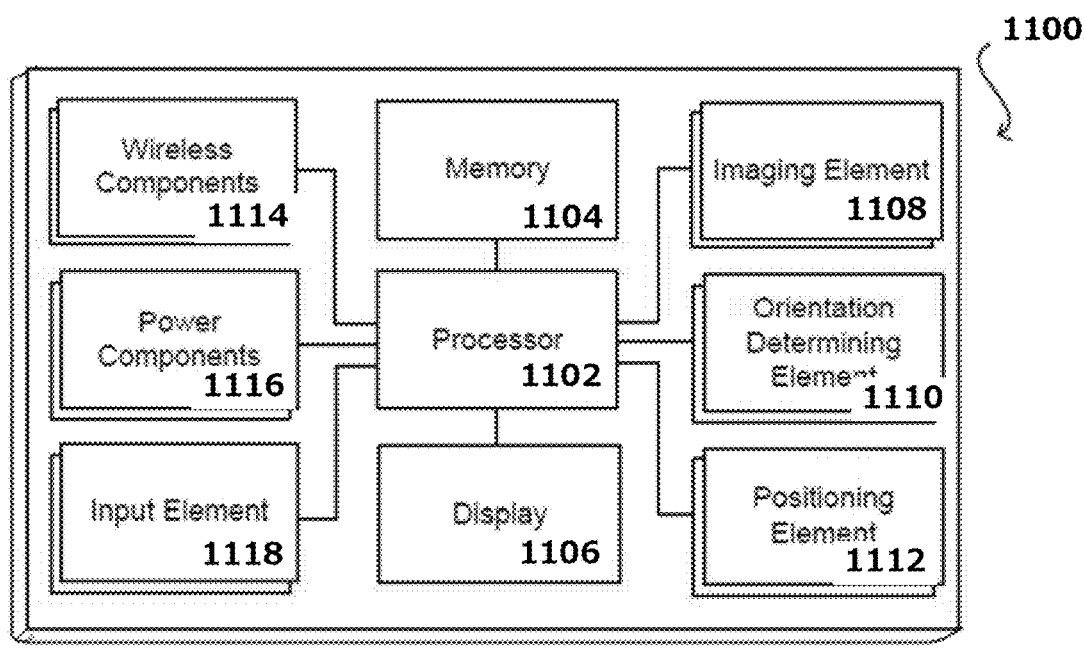
FIG. 11 illustrates a set of example components of one or more devices of the present disclosure in accordance with various embodiments.

FIG. 10 illustrates a set of components of an example computing device 1000 that can be utilized to implement aspects of the various embodiments. FIG. 11 illustrates a set of components of an example computing device 1100 that can be used to implement aspects of various embodiments. The device 1000, 1100 can include at least one processor 1102 for executing instructions that can be stored in a memory device or element 1104. As would be apparent to one of ordinary skill in the art, the device can include many types of memory, data storage or computer-readable media, such as a first data storage for program instructions for execution by the at least one processor 1102, the same or separate storage can be used for images or data, a removable memory can be available for sharing information with other devices, and any number of communication approaches can be available for sharing with other devices. The device may include at least one type of display element 1002, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1000, 1100 can include one or more imaging elements 1010, 1108. One or more orientation determining elements 1110 can determine the orientation of the device, for example in relation to a user's face or eyes. Various camera-based and other sensors 1004, 1008, 1012, 1018 can be used to determine orientation. A positioning element 1112 can determine the position of the device. The positioning element 1112 can use one or more of GPS, local network detection, Bluetooth connection, or other protocols. One or more input elements 1110 can register user input, for example input received from a touch screen display. An example device 1000, 1100 will also include power components 1116 and wireless components 1114 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

Figure 12:
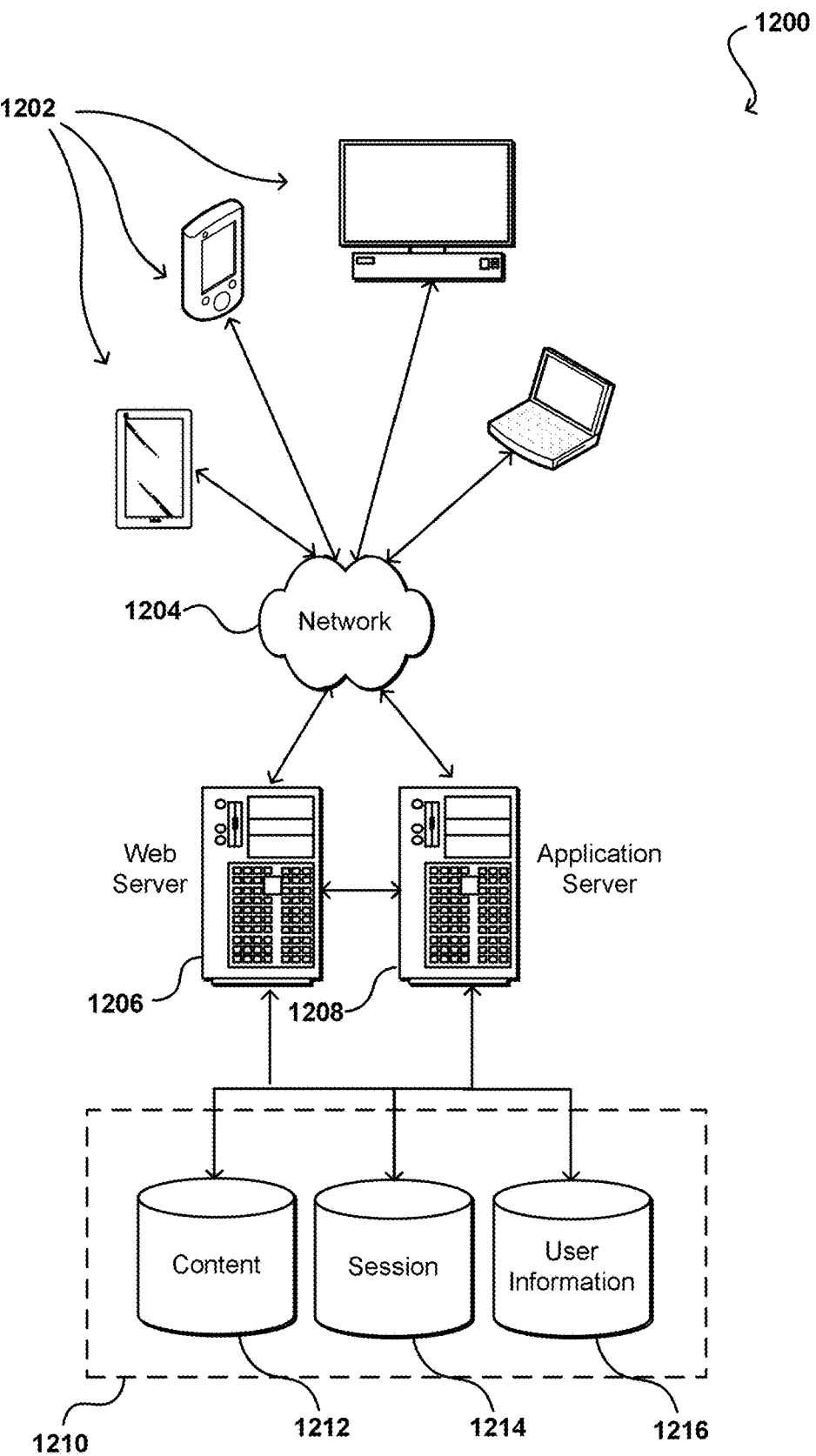
FIG. 12 illustrates an example computing environment that can be used to implement aspects of various embodiments.

FIG. 12 is an example of an illustrative environment 1200 in which embodiments can be implemented. The illustrative environment 1200 includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store as needed to execute aspects of one or more applications for the client device and handling a majority of the data access and business logic for an application. The application server 1208 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1206. It should be understood that the Web server 1206 and application servers 1208 are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store 1210 illustrated includes mechanisms for storing content 1212 (e.g., production data) and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store. The data store 1210 is operable, through logic associated therewith, to receive instructions from the application server and obtain, update or otherwise process data in response thereto. In one example, a user might submit a search request for a certain type of item. In this case, the data store 1210 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1206, 1208 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1200 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1218, 1220, 1222, 1224 which can be used to operate any of a number of applications. User or client devices 1218, 1220, 1222, 1224 can include any of a number of general purpose personal computers, such as desktop 1224 or laptop computers 1222 running a standard operating system, as well as cellular, wireless and handheld devices 1218, 1220 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1204 that would be familiar to those skilled in the art for supporting communications using any of a variety of commercially-available protocols, such as TCP/IP, FTP, UPnP, NFS, and CIFS. The network 1204 can be, for example, a local area network, a wide-area network, a virtual private network, the Internet, an intranet, an extranet, a public switched telephone network, an infrared network, a wireless network and any combination thereof.

In embodiments utilizing a Web server 1206, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM° as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1200 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
capturing a plurality of images of an object from a plurality of viewpoints about the object;
generating an initial point cloud representation of the object from the plurality of images;
determining a sparse region of the initial point cloud;
generating a preliminary surface mesh from the initial point cloud using a Delauney-based meshing algorithm, wherein the Delauney-based meshing algorithm performs piecewise linear approximation of the initial point cloud to generate the preliminary surface mesh;
sampling points from a region of the preliminary surface mesh corresponding to the sparse region of the preliminary surface mesh;
adding the points sampled from the preliminary surface mesh to the sparse region of the initial point cloud from which the preliminary surface mesh was created to form an enhanced point cloud; and
generating a final surface mesh from the enhanced point cloud using a Poisson-based meshing algorithm, wherein the final surface mesh is generated based at least in part on data obtained using both the Delauney-based meshing algorithm and the Poisson-based meshing algorithm.

2. The computer-implemented method of claim 1, comprising:
projecting a structured light pattern onto the object from a source; and
rotating the object with respect to the source to capture the plurality of images from the plurality of viewpoints.

3. The computer-implemented method of claim 1, further comprising:
providing the final surface mesh to a client device; and
providing image data associated with the object for mapping onto the final surface mesh to render a three-dimensional representation of the object on the client device.

4. A computer-implemented method, comprising:
obtaining a plurality of images of an object, the plurality of images taken from a plurality of viewpoints about the object;

generating an initial point cloud representation of the object from the plurality of images;
generating a preliminary surface mesh from the initial point cloud using a first meshing algorithm;
determining a sparse region of the initial point cloud;
sampling points from a region of the preliminary surface mesh corresponding to the sparse region of the initial point cloud;
adding the points sampled from the preliminary surface mesh to the sparse region of the initial point cloud from which the preliminary surface mesh was created to form an enhanced point cloud; and
generating a final surface mesh of the object from the enhanced point could using a second meshing algorithm different from the first meshing algorithm, wherein the final surface mesh is generated based at least in part on data obtained using both the first meshing algorithm and the second meshing algorithm.

5. The computer-implemented method of claim 4, further comprising:
generating a three-dimensional representation of the object from the enhanced point cloud.

6. The computer-implemented method of claim 4, wherein the first meshing algorithm comprises a Delauney-based meshing algorithm.

7. The computer-implemented method of claim 4, wherein the first meshing algorithm performs piecewise linear approximation of the initial point cloud to generate the initial surface mesh.

8. The computer-implemented method of claim 4, wherein the second meshing algorithm comprises a Poisson-based meshing algorithm.

9. The computer-implemented method of claim 4, wherein the points are sampled at uniform intervals about the preliminary surface mesh.

10. The computer-implemented method of claim 4, further comprising:
projecting a structured light pattern onto the object from a source; and
rotating the object with respect to the source to capture the plurality of images from the plurality of viewpoints.

11. A system, comprising:
at least one processor;
memory including instructions that, when executed by the at least one processor, cause the system to:
obtain a plurality of images of an object, the plurality of images taken from a plurality of viewpoints about the object;
generate an initial point cloud representation of the object from the plurality of images;
generate a preliminary surface mesh from the initial point cloud using a first meshing algorithm;
determine a sparse region of the initial point cloud;
sample points from a region of the preliminary surface mesh corresponding to the sparse region of the initial point cloud;
add the points sampled from the preliminary surface mesh to the sparse region of the initial point cloud from which the preliminary surface mesh was created to form an enhanced point cloud; and
generate a final surface mesh of the object from the enhanced point could using a second meshing algorithm different from the first meshing algorithm, wherein the final surface mesh is generated based at least in part on data obtained using both the first meshing algorithm and the second meshing algorithm.

12. The system of claim 11, wherein the second meshing algorithm comprises a Poisson-based meshing algorithm.

13. The system of claim 11, wherein the first meshing algorithm comprises a Delauney-based meshing algorithm.

14. The system of claim 11, wherein the first meshing algorithm performs piecewise linear approximation of the initial point cloud to generate the initial surface mesh.

15. The system of claim 11, wherein the points are sampled at uniform intervals about the initial surface mesh.

\* \* \* \* \*